United States Patent Office 3,355,414
Patented Nov. 28, 1967

3,355,414
THERMOSETTING POLYESTERS
John R. Caldwell and Winston J. Jackson, Jr., Kingsport, Tenn., assignors to Eastman Kodak Company, Rochester, N.Y., a corporation of New Jersey
No Drawing. Filed Sept. 14, 1961, Ser. No. 137,976
18 Claims. (Cl. 260—33.8)

This invention relates to thermosetting polyesters. More particularly the invention relates to synthesis of novel linear copolyesters containing a recurring functional olefinic radical capable of thermosetting by a cross-linking reaction at elevated temperatures.

Schnell, in Angew. Chemie, 68, 633–660 (1956), showed that high molecular weight thermoplastic linear polycarbonates can be synthesized from saturated diacid chlorides and saturated bisphenols. In our copending application Serial No. 137,980, now abandoned, entitled Bisphenol Polyesters filed of even date herewith are disclosed additional linear thermoplastic polyesters from novel bisphenols. In the above disclosures the interfacial polycondensation process is used for synthesis of the thermoplastic polyester. In this process the reaction is conducted at room temperature and a polyester is formed by polycondensation of a diacid chloride with a bisphenol at the interface between two immiscible liquid phases. In one phase (the organic solvent phase) is dissolved a diacid halide and in the other phase (alkaline aqueous phase) is dissolved a bisphenol. Interfacial polycondensation processes are discussed at length by P. W. Morgan in Society of Plastics Engineers Journal 15, 485–495 (1959).

We have synthesized useful linear thermosetting polyesters containing recurring units in which a functional olefinic linkage $\{C=C\}$ occurs. The linear polyesters are synthesized by an interfacial polycondensation process at temperatures well below the elevated temperature necessary to activate the functional olefinic double bond. These linear polyesters are soluble in most commercial organic solvents (e.g., methylene chloride) and can be cast as films from the solvent. When the films are cured at elevated temperatures cross-linking occurs at the functional olefinic linkages and a tough, durable, insoluble, polymeric film results. The cross-linking may be accelerated by a catalyst. Using interfacial polycondensation procedures we have synthesized useful thermosetting polyesters using as the diacid halide constituent phosgene alone and also using a mixture of phosgene with another diacid chloride, either a diol bischloroformate or a dicarboxylic acid chloride. Such polyesters were prepared using both saturated and unsaturated bisphenols. In the polyesters of the invention the functional olefinic group may occur in recurring units which are polycondensation residues of either a diacid chloride (diol bischloroformate or dicarboxylic acid chloride) or the bisphenol. In other words, thermosetting polyesters may be prepared by interfacial polycondensation using either an olefinic dicarboxylic acid chloride or a bischoloroformate of an olefinic diol or an unsaturated bisphenol, in which at least one functional olefinic linkage occurs.

From the linear thermosetting polyesters useful coating compositions are conveniently prepared by dissolving the polyester in a volatile solvent. A suitable catalyst for the cross-linking (curing) reaction is preferably included in the liquid coating composition.

In one embodiment of the invention a bisphenol was condensed with phosgene and the bischoloroformate of a hydroxy-terminated linear short-chain polyester containing functional olefinic groups. These short-chain hydroxy terminated polyesters are obtained by conventional condensation methods, as by heating a calculated excess of a diol with a dicarboxylic acid or ester. Suitable polyester diols may have molecular weights ranging from 800 to 5000. Enough of the bischloroformate of these polyester diols is used in the bisphenol condensation so that the final polycarbonate contains from 10% to 50% by weight of the unsaturated polyester residues.

The monomeric diol component of the short-chain hydroxy-terminated linear polyester may be aliphatic or alicyclic and primary or secondary. The carbon chain may be straight or branched and may contain from 2–20 carbon atoms. The monomeric diol may be unsaturated, such as 1,4-butenediol and 4-cyclohexene-1,2-dimethanol, or it may be saturated such as 2,2-dimethyl-1,3-propanediol and 1,4-cyclohexane dimethanol. The monomeric dicarboxylic acid components of this polyester may be saturated if an unsaturated diol is used. Then the monomeric diacid, or its ester, may be aliphatic, aromatic, or alicyclic. If a saturated monomeric diol is used, then the monomeric acid must be unsaturated, such as maleic, fumaric, itaconic, citraconic, ethylidenemalonic, and bicyclo(2.2.1)hept-5-ene-2,3-dicarboxylic acid. To prepare the bischloroformate phosgene was added to an ethylene dichloride solution of the short chain polyester diol. After the solution stood overnight dry air was passed through the solution until all of the hydrogen chloride and excess phosgene were swept out. The bischloroformate solution then could be added as needed to the polycondensation reaction mixture. It may be added either before or after a portion of the phosgene is added to the mixture.

In another embodiment bisphenol polyesters were prepared in which a functional olefinic group occurs in recurring residues of an unsaturated monomeric dicarboxylic acid chloride. Suitable dibasic acid chlorides contain an aliphatic double bond and from 4–20 carbon atoms. Some examples are the chlorides of fumaric acid, itaconic acid, citraconic acid, and ethylidenemalonic acid. The amount of unsaturated diacid chloride added should be .10–.50 mole per mole of biphenol. The remaining .90–.50 mole of diacid chloride will be phosgene and/or a bischloroformate of a diol (saturated or unsaturated).

In still another embodiment the functional olefinic group occurs in recurring units which are polycondensation residues of an unsaturated bisphenol. Unsaturated bisphenols are prepared by condensing two moles of a phenol with one mole of an unsaturated aldehyde or ketone in an acidic medium. Bisphenols of alicyclic aldehydes or ketones give polycarbonates having better high temperature characteristics (higher heat distortion temperatures, higher melting ranges, etc.), therefore, it was a matter of interest to produce unsaturated alicyclic bisphenols as intermediates for producing linear polycarbonates in which a functional olefinic linkage occurs in the bisphenol residue. Following are formulas for the preparation of such bisphenols.

(A)

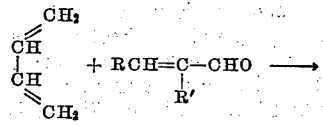

+ RCH=C—CHO ⟶
       |
       R′

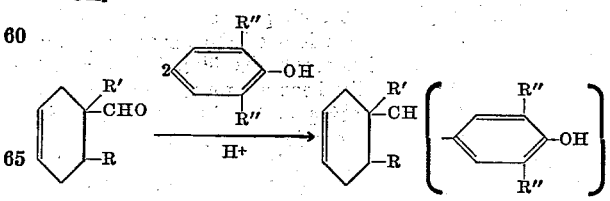

(B)

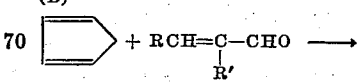

+ RCH=C—CHO ⟶
       |
       R′

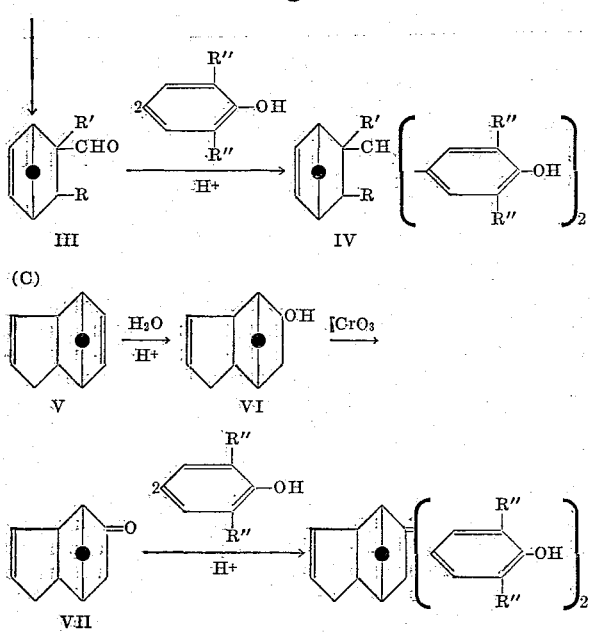

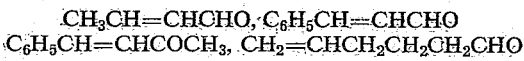

R=Hydrogen, methyl, ethyl, propyl, butyl or phenyl
R′=Hydrogen, methyl, ethyl, propyl or butyl
R″=Hydrogen, methyl, ethyl, propyl, butyl or chlorine.

Bisphenols of unsaturated aliphatic aldehydes and ketones may be obtained from compounds such as the following:

$CH_3CH=CHCHO$, $C_6H_5CH=CHCHO$
$C_6H_5CH=CHCOCH_3$, $CH_2=CHCH_2CH_2CH_2CHO$

In reactions A and B elements of water or of the catalysts may be added across the double bond of the unsaturated carbonyl compound or of the product if the reaction conditions are not very mild. It is, therefore, preferable to carry out the condensation reaction below room temperature. In reaction C the ketone is prepared by adding water across the active double bond in dicyclopentadiene, then oxidizing the resulting carbinol to ketone with chromic acid. In general, aldehydes react faster than ketones and are therefore preferred. The acidic medium for the phenol condensation may consist of hydrochloric acid or dilute sulfuric acid. Also boron trifluoride etherate, aluminum chloride, methionic acid, and other similar acidic compounds may be used (1 mole per mole of carbonyl compound). The reaction is also accelerated by the presence of a little β-mercaptopropionic acid.

Polycarbonates (polyesters of carbonic acid) of the unsaturated bisphenols were prepared by an interfacial polycondensation process with phosgene as the diacid halide. Some of the phosgene may be replaced by a diol bischloroformate, preferably one that is unsaturated.

Coating compositions were prepared by dissolving the polyester products of the above examples in a volatile solvent. A suitable catalyst for the thermosetting reaction was added to some of the liquid composition. When this composition is applied as a coating on metal surfaces the solvent evaporates leaving a film of the linear polyester with catalysts dispersed through the film. When cured by exposure to heat the film becomes tough, durable, and insoluble due to cross-linking at the functional olefinic double bonds in the linear polymer chains. Even better thermosetting coating compositions were obtained by adding 10–30 parts by weight of an unsaturated alkyd resin per 90–70 parts of the bisphenol polyester. Suitable alkyd resins are those obtained by polymerizing glycols with esters of unsaturated acids (maleic, fumaric, itaconic, citraconic, ethylidene malonic, etc.). Another effective type of alkyd resin is obtained by heating linseed oil, dicyclopentadiene, and an unsaturated compound, such as diallyl phthalate, diallyl maleate or divinyl benzene.

Curing of the thermosetting film is accomplished by exposing the linear polyester to temperatures of 100° C. or higher for a period of time. A catalyst will reduce the necessary curing time substantially. In most cases, when using a catalyst, about 2–4 hours at 100°–150° C., or 15 minutes at 200° C., will be sufficient to produce thermosetting of the coatings described herein. Suitable catalysts for the curing reaction (cross-linking at the double bond of the functional olefinic group) are organic salts of cobalt, manganese, and lead. Examples of such salts are manganese hexanoate, cobalt naphthenate and lead pelargonate. The metal, added as the salt, should be present in amounts from 0.01 to 0.20 weight percent based on the polymer. With polyesters in which the thermosetting functional olefinic group occurs in a unit which is a residue of a diacid chloride, peroxides such as benzoyl or dicumyl peroxides will accelerate the cross-linking reaction when present in amounts from 3–5 weight percent based on the polymer. The catalyst may conveniently be added when the linear polycarbonate is dissolved in a volatile solvent to make liquid coating compositions. When the coating composition has been applied and has dried, the catalyst remains evenly distributed through the polyester.

The thermosetting polyesters of the invention are especially useful in compositions for coating metal surfaces and the cured film coatings adhere especially well to such surfaces.

In the following examples are illustrated synthesis of specific novel polyesters within the scope of the invention and synthesis of specific bisphenol intermediates useful for making certain polyesters within the scope of the invention.

SYNTHESIS OF UNSATURATED BISPHENOLS

Example 1

4,4′ - (3 - cyclohexene - 1 - ylmethylene)diphenol.— 3-cyclohexene-1-carboxaldehyde was prepared by heating 2 moles of acrolein with 2.4 moles of butadiene at 200° C. for 20 minutes. The product distilled at 51° C./11 mm.; $n_D^{20}$ 1.4720. Hydrochloric acid (150 ml.) was then slowly added to a cool, stirred mixture containing 1.2 moles of phenol, 0.3 mole of the aldehyde and 1.5 ml. of β-mercaptopropionic acid. The reaction was exothermic and the temperature was kept below 15° C. with an ice bath. After this mixture was stirred for 4 hours at 10–15° C. it was filtered. The product was washed with water several times and then with benzene. After recrystallization from aqueous acetic acid it melted at 221–223° C.

Example 2

4,4′ - (6 - methyl - 3 - cyclohexene - 1 - ylmethylene) diphenol.—6-methyl-3-cyclohexene-1-carboxaldehyde was prepared by heating crotonaldehyde with butadiene for 3 hours at 180° C. The product distilled at 92°/48 mm.; $n_D^{20}$ 1.4671. The bisphenol was prepared from this aldehyde according to the procedure of Example 1. After recrystallization from aqueous acetic acid it melted at 197–199° C.

Example 3

4,4′ - (3 - methyl - 5 - norbornen - 2 - ylmethylene) diphenol.—3 - methyl - 5 - norbornene - 2 - carboxaldehyde was prepared by heating 2 moles of crotonaldehyde with 1 mole of dicyclopentadiene in an autoclave at 180° C. for 1 hour. The product distilled at 60–62° C./8 mm. and consisted of 2 isomers. The bisphenol was prepared with this aldehyde according to the procedure of Example 1. After recrystallization from aqueous acetic acid the isomer mixture melted at 200–204° C.

Example 4

4,4′-(2-butenyl)diphenol. — This bisphenol was prepared from crotonaldehyde and phenol according to the procedure of Example 1. The temperature was held below 10° C. at all times. The crude product was dissolved in 20% aqueous sodium hydroxide and heated on the steam bath. The bisphenol was then precipitated by acidifying with acetic acid. After recrystallization from aqueous acetic acid the bisphenol melted at 94–97° C.

*Example 5*

4,4' - (3a,4,5,6,7,7a - hexahydro - 4,7 - methanoindan-6-ylidene)diphenol. — 3a,4,5,6,7,7a - hexahydro - 4,7-methanoindan-6-one was prepared by the hydration of dicyclopentadiene and then chromic acid oxidation as described by Bruson and Riener, J. Am. Chem. Soc. 67, 726 (1945). (Correct structures were given by Bartlett and Schneider, J. Am. Chem. Soc. 68, 6 (1946).) The bisphenol was prepared by stirring a mixture containing 0.50 mole of the above ketone, 2.0 moles of phenol, 125 g. of concentrated hydrochloric acid and 2.5 g. of β-mercaptopropionic acid at 50° C. for 8 hours. The mixture was then cooled, stirred with benzene (to remove excess phenol), and filtered. The crystallized product was washed several times with benzene and water. After recrystallization from 50% aqueous acetic acid the bisphenol melted at 217–220° C.

SYNTHESIS OF BISPHENOL POLYESTERS

*Example 6*

A polycarbonate was prepared by adding 4.0 g. of phosgene to a cooled, stirred mixture containing 0.03 mole of the bisphenol described in Example 1, 3.6 g. of sodium hydroxide, 60 ml. of water, 40 ml. of methylene chloride and 2 drops of tri-n-butylamine. When the methylene chloride layer became thick, the mixture was neutralized with acetic acid. The organic layer was then diluted with more methylene chloride, thoroughly washed with water and added to hexane to precipitate the polymer. Inherent viscosity of the product was 0.71. A film of the polymer, cast from methylene chloride, had a heat distortion temperature of 198° C.

*Example 7*

A polycarbonate was prepared from the bisphenol of Example 2 and phosgene according to the procedure of Example 6. It had an inherent viscosity of 0.93. A film cast from methylene chloride had a heat distortion temperature of 210° C.

*Example 8*

A polycarbonate was prepared from the bisphenol of Example 3 and phosgene by the method of Example 6. The inherent viscosity was 0.65. A film cast from methylene chloride had a heat distortion temperature of 228° C.

*Example 9*

A polycarbonate was prepared from the bisphenol of Example 4 and phosgene by the method of Example 6. The inherent viscosity was 0.56.

*Example 10*

A polycarbonate was prepared from the bisphenol of Example 5 and phosgene according to the procedure of Example 6. It had an inherent viscosity of 0.87 and a melting point above 300° C. A film cast from methylene chloride had a heat distortion temperature of 260° C.

*Example 11*

To a cooled, stirred mixture containing 5.7 g. of sodium hydroxide, 100 ml. of water, 2 drops of tri-n-butylamine, 11.4 g. (0.050 mole) of 4,4'-(isopropylidene)diphenol, and 60 ml. of methylene chloride was added 40 ml. of an ethylene dichloride solution containing 0.025 mole of the bischloroformate of 1,4-butenediol. The temperature of the mixture was held at 15–20° C. After 10 minutes 2.7 g. of phosgene was passed into the stirred mixture. When the methylene chloride layer became viscous (about one-half hour later), 5 ml. of acetic acid was added to neutralize the alkali. The organic layer was then diluted with more methylene chloride, thoroughly washed with water. The polymer was precipitated by adding to hexane while stirring.

*Example 12*

A polymer was prepared from 0.050 mole of 4,4'-(2-norcamphanylidene)diphenol, 0.025 mole of fumaryl chloride, and 0.027 mole of phosgene according to the procedure of Example 11.

*Example 13*

A polycarbonate was prepared from 0.050 mole of 4,4'-(2 - norcamphanylidene)bis(2,6 - dichloro phenol), 0.010 mole of the acid chloride of ethylidenemalonic acid and 0.042 mole of phosgene according to the procedure of Example 11.

*Example 14*

A polycarbonate was prepared frm 0.050 mole of 4,4'-(hexahydro-4,7 - methanoindan - 5 - ylidene)diphenol, 0.010 mole of the bischloroformate of 4-cyclohexane-1,2-dimethanol, and 0.042 mole of phosgene by the method of Example 11.

*Example 15*

A polymer was prepared from 0.050 mole of 4,4'-(3-methyl-2-norcamphanylmethylene)diphenol, 0.010 mole of the acid chloride of itaconic acid, and 0.042 mole of phosgene by the procedure of Example 11.

*Example 16*

A polymer was prepared from 0.050 mole of 4,4'-(hexahydro-4,7-methanoindan-5-ylidene)diphenol, 0.015 mole of fumaryl chloride, and 0.040 mole of phosgene by the method of Example 11.

*Example 17*

To a cool stirred mixture containing 6.0 grams of sodium hydroxide, 100 ml. of water, 2 drops of tri-n-butylamine, 11.4 grams (0.050 mole) of Bisphenol A, and 60 ml. of methylene chloride was added 40 ml. of an ethylene dichloride solution containing the bischloroformate of 5.0 grams of a short-chain hydroxy-terminated polyester. (The short-chain polyester had a molecular weight of 2000 and was obtained from 2,2-dimethyl-1,3-propanediol and fumaric acid.) The temperature of the mixture was held at 15–20° C. After 10 minutes, 5.6 grams of phosgene was passed into the stirred mixture. When the methylene chloride layer became viscous (about 20 minutes later), 5 ml. of acetic acid was added. The organic layer was then diluted with more methylene chloride and thoroughly washed with water. The polymer was precipitated by adding to hexane while stirring.

*Example 18*

A polymer was prepared frm 0.050 mole of 4,4'-(hexahydro - 4,7 - methanoindan - 5 - ylidene)diphenol and 7.0 grams of the hydroxy-terminated polyester (added as the bischloroformate) of molecular weight 1200 obtained from 1,4-cyclohexane-dimethanol and maleic anhydride. The procedure of Example 17 was followed except for the phosgene addition: 4.0 grams was added before the bischloroformate, which was added 5 minutes later, and, after another 10 minutes 2.0 grams more of phosgene was added.

*Example 19*

The procedure of Example 17 was used to prepare a polymer from 0.050 mole of 4,4'-(2-norcamphanylidene)diphenol and 10.0 grams of hydroxy-terminated polyester (molecular weight 2500) obtained from 1,4-butenediol and sebacic acid.

*Example 20*

The procedure of Example 17 was used to prepare a polymer from 0.050 mole of 4,4'-(3-methyl-2-norcamphanylmethylene)diphenol and 3.0 grams of the hydroxy-terminated polyester (molecular weight about 4000) obtained from 1,6-hexanediol and itaconic acid.

COATING COMPOSITIONS

Polyester products of the preceding examples were incorporated in coating compositions consisting of the bisphenol polyester dissolved in a methylene chloride vehicle. In some cases a catalyst was added to the coating composition. In some cases an alkyd resin was also added to the coating composition. The compositions were diluted with methylene chloride to a consistency suitable for spreading as a coating. Compositions were spread as a thin coating on metal surfaces and were dried to films by permitting the solvent to evaporate at room temperature. The film coatings were then cured by exposure in an oven to elevated temperatures for a period of time. In the following table in tabulated form are shown the various coating compositions which were made, the curing temperature and time and the results observed. In Column I the number refers to the example above by which the polyester was obtained. In Column II is shown the type catalyst used and the weight percent based on the weight of the polyester. In Column III is shown the type of alkyd resin, when used, and the weight percent, based on the polymer, of alkyd resin added. Column IV shows the curing temperature and time. Methylene chloride was the volatile solvent used in all of these compositions. All of these films, when cured, were insoluble in methylene chloride, toluene, dioxane, and other commercial organic solvents. They adhered well to metal surfaces and most of the films could not be removed by Scotch tape which was stuck to the film and then pulled away. Curing of the films at 200° C. for 15 minutes produced better results than did the slower curing at temperatures from 100°–140° C. Compositions containing added alkyd resins produced tighter bonding than those containing only the bisphenol polyesters.

unsaturated bisphenols being selected from the group consisting of (a) 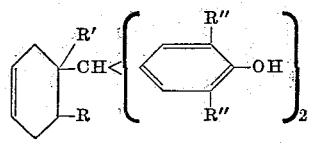

(b) 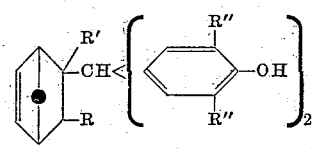

and (c) 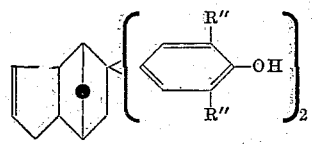

wherein R is a member selected from the group consisting of hydrogen atoms and methyl, ethyl, propyl, butyl, and phenyl groups, R' is a member selected from the group consisting of hydrogen atoms and methyl, ethyl, propyl, and butyl groups, and R'' is a member selected from the group consisting of hydrogen atoms, chlorine atoms, and methyl, ethyl, propyl, and butyl groups, and (B) a diacid chloride selected from the group consisting of (1) a bischloroformate of an olefinically unsaturated diol having a molecular weight of less than about 800, (2) a bischloroformate of a hydroxy terminated polyester derived from an excess of a diol having from 2 to 20 carbon atoms and a dicarboxylic acid and having a molecular weight of from about 800 to about 5000 in which polyester one of the polyester constituents contains olefinic unsaturation, and (3) phosgene, said bisphenol necessarily being (a), (b),

| I | II | III | IV |
|---|---|---|---|
| Polyester from Example— | Curing catalyst (percent added) | Alkyd resin (percent added) | Curing temp./curing time |
| 6–10 | Cobalt naphthenate (0.1%) | None | 110° C./3 hr. |
| 6–10 | ___do___ | ___do___ | 200° C./15 min. |
| 6 | ___do___ | 10% alkyd resin from linseed oil dicyclopentadiene and diallyl phthalate. | 110° C./2 hr. |
| 11 | Benzoyl peroxide (3%) | None | 100° C./2 hr. |
| 11 | None | ___do___ | 200° C./15 min. |
| 12 | Cobalt naphthenate (0.1% cobalt). | ___do___ | 120° C./3 hr. |
| 13 | Dicumyl peroxide (5%) | 20% alkyd resin from diethyl maleate and diethylene glycol (mol. wt., 2,500). | 180° C./1 hr. |
| 14 | Manganese hexanoate (0.1% manganese). | 20% alkyd resin (mol. wt., 2,000) from glyceryl allyl ether and phthalic anhydride. | 100° C./3 hr. |
| 15 | Benzoyl peroxide (3%) | 20% alkyd resin (mol. wt., 2,500) from dimethyl citraconate and 1,4-butanediol. | 120° C./2 hr. |
| 16 | None | None | 200° C./15 min. |
| 17–19 | Cobalt naphthenate (0.3%) | ___do___ | 140° C./2 hr. |
| 17–19 | None | ___do___ | 200° C./15 min. |
| 20 | Cobalt naphthenate (0.3%) | 20% alkyd resin (mol. wt., 2,000) from linseed oil, cyclopentadiene and diallyl phthalate. | 140° C./4 hr. |

The above examples illustrate specific embodiments of the invention and should not be construed to limit the scope of the invention as defined in the following claims.

We claim:

1. An olefinically unsaturated, linear thermosetting polycarbonate or copoly(ester-carbonate) of constituents consisting essentially of (A) a member selected from the group consisting of bisphenols free of olefinic unsaturation and olefinically unsaturated bisphenols, said olefinically or (c) when said diacid chloride is solely composed of phosgene in which case said polymer is a polycarbonate.

2. A thermosetting polymer as defined by claim 1 wherein said constituent (B) (2) is the bischloroformate of a hydroxy terminated polyester of a saturated diol and a monomeric diacid containing a functional olefinic group.

3. A thermosetting polymer as defined by claim 2 wherein said monomeric diacid is a member selected from the group consisting of maleic acid, fumaric acid, itaconic acid, citraconic acid, ethylidene malonic acid, and bicyclo-(2.2.1)-hept-5-ene-2,3-dicarboxylic acid.

4. A thermosetting polymer as defined by claim 3 wherein said constituent (A) is 4,4' - (hexahydro - 4,7-methanoindan-5-ylidene)diphenol and said constituent (B) is phosgene and the bischloroformate of the hydroxy terminated polyester having a molecular weight of about 1200 of 1,4-cyclohexanedimethanol and maleic anhydride.

5. A thermosetting polymer as defined by claim 1 wherein said constitutent (B) (2) is the bischloroformate of a hydroxy terminated polyester of a monomeric saturated diacid and a monomeric diol which contains from 4 to 20 carbon atoms and which contains a functional olefinic double bond.

6. A thermosetting polymer as defined by claim 5 wherein said monomeric diol is a member selected from the group consisting of 1,4-butenediol and 4-cyclohexene-1,2-dimethanol.

7. A thermosetting polymer as defined by claim 6 wherein said constiutent (A) is 4,4'-(hexahydro-4,7-methanoindan - 5-ylidene)diphenol and said constituent (B) is phosgene and the bischloroformate of 4-cyclohexene-1,2-dimethanol.

8. A thermosetting polymer as defined by claim 6 wherein said constituent (A) is 4,4'-(2-norcamphanylidene)diphenol and said constituent (B) is phosgene and the bischloroformate of the hydroxy terminated polyester having a molecular weight of about 2500 of 1,4-butenediol and sebacic acid.

9. A thermosetting polymer as defined by claim 1 wherein said constituent (A) is an unsaturated bisphenol selected from the group consisting of (a) 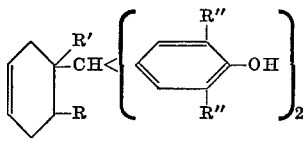

(b) 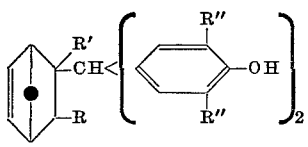

and (c) 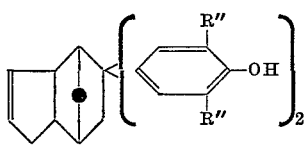

wherein R is a member selected from the group consisting of hydrogen atoms and methyl, ethyl, propyl, butyl, and phenyl groups, R' is a member selected from the group consisting of hydrogen atoms and methyl, ethyl, propyl, and butyl groups and R" is a member selected from the group consisting of hydrogen atoms, chlorine atoms, and methyl, ethyl, propyl, and butyl groups.

10. A thermosetting polymer as defined by claim 9 wherein said constituent (A) is 4,4'-(3-methyl-5-norbornen-2-ylmethylene)diphenol and said constituent (B) is phosgene.

11. A thermosetting polymer as defined by claim 9 wherein said constituent (A) is 4,4' - (3a,4,5,6,7,7a-hexahydro-4,7-methanoindan-6-ylidene)diphenol and said constituent (B) is phosgene.

12. A coating composition comprising a linear thermosetting polymer as defined by claim 1 dissolved in an organic solvent selected from the group consisting of methylene chloride, toluene, and dioxane.

13. A coating composition as defined by claim 12 and containing a sufficient amount of a catalyst capable of cross-linking said functional olefinic groups in said polymer when spread in a thin film exposed to the atmosphere at an elevated temperature.

14. A coating composition as defined by claim 13 wherein said catalyst is cobalt naphthenate, said constituent (A) is 4,4' - (3-methyl-5-norbornen-2-ylmethylene)diphenol and said constituent (B) is phosgene.

15. A coating composition as defined by claim 13 and containing an unsaturated alkyd resin.

16. A coating composition as defined by claim 15 wherein said solvent is methylene chloride, said catalyst is selected from the group consisting of cobalt naphthenate, manganese hexanoate, benzoyl peroxide, and dicumyl peroxide.

17. A coating composition as defined by claim 16 wherein said catalyst is manganese hexanoate and said alkyd resin is from glyceryl allyl ether and phthalic anhydride.

18. A coating composition as defined by claim 17 wherein said constituent (A) is 4,4'-(hexahydro-4,7-methanoindan - 5-ylidene)diphenol and said constituent (B) is phosgene and the bischloroformate of 4-cyclohexene-1,2-dimethanol.

References Cited

UNITED STATES PATENTS

| | | | |
|---|---|---|---|
| 2,761,879 | 9/1956 | Soloway | 260—598 |
| 2,883,365 | 4/1959 | Mathes. | |
| 2,991,273 | 7/1961 | Hechelhammer et al. | 260—47 X |
| 3,030,331 | 4/1962 | Goldberg | 260—47 X |
| 3,043,802 | 7/1962 | Thoma et al. | 260—47 X |
| 3,053,803 | 9/1962 | Jaffe et al. | |
| 3,124,554 | 3/1964 | Schnell et al. | 260—47 X |
| 3,164,564 | 1/1965 | Butterworth et al. | 260—47 X |
| 3,220,976 | 11/1965 | Goldberg | 260—47 X |

OTHER REFERENCES

Conix, I and E Chem., vol. 51, pages 147–150 (February 1959), S/L Call No. TP, 1, A58.

SPE Journal, June 1959, pages 485–495, S/L.

Polyester Resins, Reinhold Publishing Corp., 1960, pages 22–26, S/L Call No. TP, 986, P6L3.

WILLIAM H. SHORT, *Primary Examiner.*

LOUISE P. QUAST, SAMUEL H. BLECH, *Examiners.*

J. C. MARTIN, C. A. WENDEL, *Assistant Examiners.*